Aug. 15, 1933.          I. FAGELSTON                1,922,939
                   APPARATUS FOR GAS ANALYSIS
                   Filed March 12, 1931      2 Sheets-Sheet 2
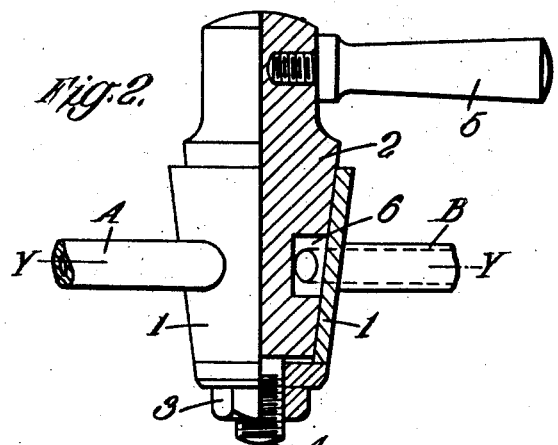
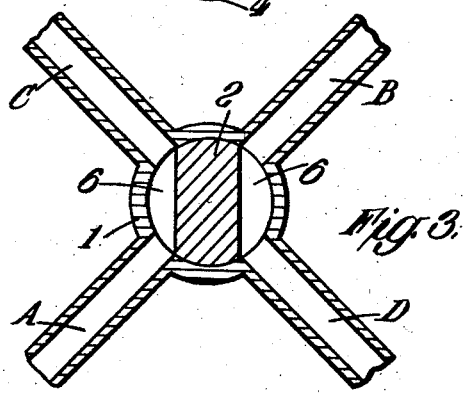
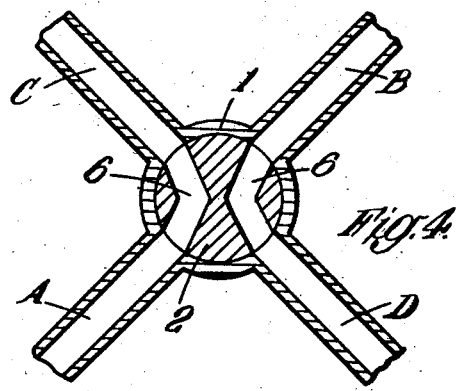
Inventor:
Isaac Fagelston,
By Spear, Donaldson & Hall
                        Attys.

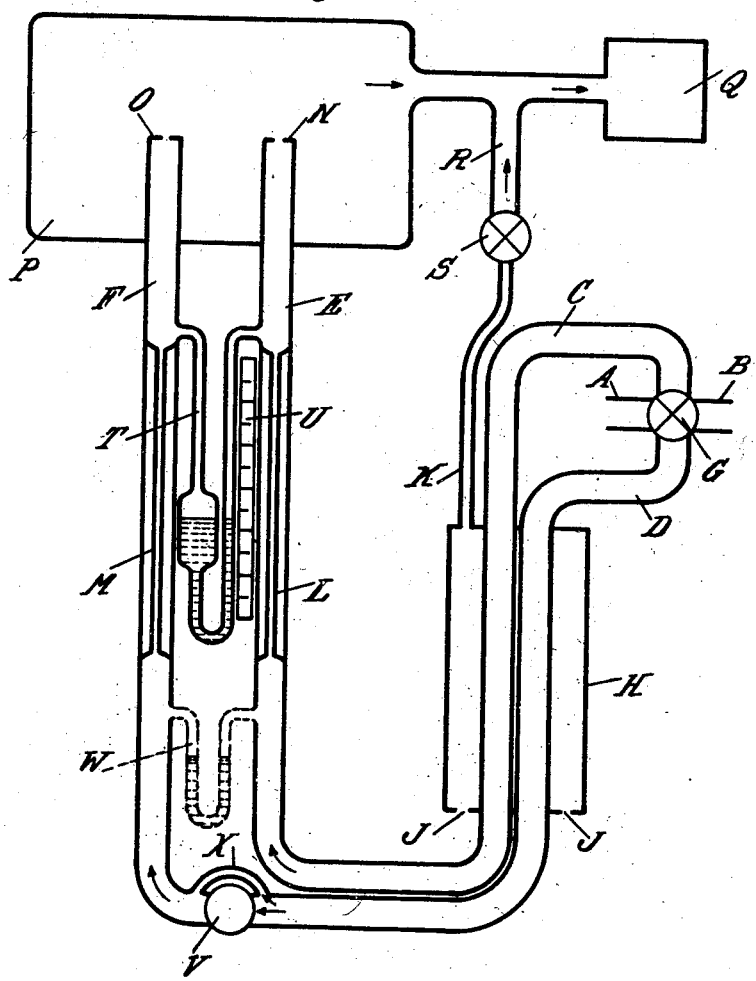

Patented Aug. 15, 1933

1,922,939

UNITED STATES PATENT OFFICE 1,922,939

APPARATUS FOR GAS ANALYSIS

Isaac Fagelston, London, England

Application March 12, 1931. Serial No. 522,079

3 Claims. (Cl. 73—51)

The present invention relates to apparatus for gas analysis of the type wherein the gas to be analysed and any other standard gas are respectively passed through two tubes so constructed and arranged that, by a comparison of the gas pressures existing at certain points within the respective tubes, the composition of the gas under test may be deduced. In many cases air is employed as the standard gas with which a comparison is made and in the present description and in the following claims forming part of this specification the term "standard gas" is to be regarded as including air or any other gas which in the particular circumstance may be found suitable as a standard of comparison.

An object of the invention is to provide means whereby the standard gas and gas under test may be readily interchanged as between the tubes through which they are passed for the purpose of comparison, resulting in increased sensitivity and accuracy. By this means the indication given on the manometric or other pressure-difference indicating device may be doubled by obtaining readings on opposite sides of zero; also errors resulting from small changes in the zero reading of the manometer or the like may be eliminated.

A further object of the invention is to provide means for equalizing the temperatures of the standard gas and of the gas under test before their introduction into the respective comparison tubes.

Another object of the invention lies in the provision of means for increasing the stability of operation and sensitivity of the apparatus by predetermining the ratios of the pressures existing at specific points in each comparison tube.

A still further object of the invention is to provide means for regulating admission of gas to either of the comparison tubes, thereby controlling the gas pressure in that tube and permitting adjustment of the zero reading of the instrument as may be necessary from time to time due to slight variations in surrounding physical conditions. The said controlling means includes a by-pass having for one of its objects the prevention of such disturbance in the conditions subsisting in the instrument as would interfere with its operation, which might occur if the supply of gas were cut off from one of the comparison tubes.

In order that the invention may be clearly understood and readily carried into effect, one application thereof has, by way of example, been illustrated in the accompanying drawings and will now be described.

In the drawings:—

Figure 1 illustrates the general arrangement of the apparatus as a whole diagrammatically;

Figure 2 is an elevation partly in section of a four-way interchange valve employed in the apparatus;

Figure 3 is a section on the line Y—Y of Figure 2; and

Figure 4 is a view corresponding to Figure 3 of a modified form of four-way valve.

It will be understood that the apparatus is constructed of material such, for example, as glass upon which gases likely to be passed through the apparatus have no action. The apparatus is provided with two inlets A and B for the introduction of the standard gas and of the gas to be analysed. These inlets communicate with two tubes C and D leading respectively to the comparison tubes proper E and F. Connection between the inlets A and B and the tubes C and D respectively is preferably by means of a four-way valve G of any suitable construction whereby connections may be reversed; that is to say, that the gas entering by the inlet A may be directed to the tube C while that introduced through the inlet B passes to the tube D or, conversely, connections may be made from A to D and B to C respectively. The valve G is depicted in Figures 2 and 3, and comprises a conical barrel 1 with which the inlet tubes A and B and outlet tubes C and D, spaced apart by approximately 90°, communicate. Fitting within the barrel 1 there is a conical plug 2 retained in position by means of a nut 3 in engagement with a threaded extension 4 of the plug 2. A handle 5 attached to the upper end of the plug serves for the purpose of rotating it. At the level of the tubes A, B, C and D the plug 2 is cut away on opposite sides to form channels 6, whereby either, as indicated in the drawings, the tubes A and C and B and D may be placed in communication or by rotating the plug through 90° the tubes A and D and B and C may be connected. In the form of valve shown in Figure 4, instead of the channels 6 being constituted by cut-away portions, they are, as clearly indicated, formed as ducts within the plug 2 itself. The tubes C and D are so shaped and arranged that substantially equal lengths of them lie in juxtaposition and are surrounded by a jacket H through which air is passed for the purpose of equalizing the temperature of the gases in the tubes C and D. The air enters the jacket H through orifices J and is evacuated through a tube K in the manner and for the further purpose hereinafter described. On emergence from the jacket H the tubes C and D are formed and arranged to constitute adjacent substantially vertical comparison tubes E and F. Within each of these tubes there is provided a restricted capillary portion L or M, through which the gases are passed, and, further, at or near the exit of each of the tubes E and F at the upper end, there is located a plate N or O having an orifice of predetermined dimensions. Tubes E and F open into a chamber P from which the mixed gases are drawn through an outlet connected to an exhaust pump or like extracting device Q. The sucking effect of the exhausting apparatus on the gases drawn through the tubes, which determines the rate of their passage, is regulated by the provision of an air-leak branch tube R opening into the tube connecting the chamber P with the exhausting apparatus Q and communicating with the tube K by means of a valve S whereby the rate at which air is drawn through the jacket H and is allowed to leak into the suction pipe is regulated.

To determine the composition of the gas under test with reference to the standard gas, the pressures existing in the spaces between the capillary tube and the orifice plate in the respective comparison tubes are compared, and in the example illustrated this is effected by the manometric tube T provided with a scale U. Either of the tubes, for instance, in the apparatus illustrated, the tube D may be provided with a valve V capable of fine adjustment whereby the rate of gas admission to, and therefore the pressure in, the corresponding comparison tube F may be regulated. In cases in which the gases admitted do not bear any fixed pressure relationship to one another, the valve V may be employed to secure equality of pressure at the inlets of the capillaries, and to compare the pressures existing at these points a manometric tube W or equivalent device, as shown dotted, may be provided. Associated with the valve V there is a by-pass X constructed to present substantial resistance to the passage of gas, but operative on closure of the valve V to prevent such inequality of the pressures in the comparison tubes E and F as would result in the apparatus being put out of action due to such cause as the liquid in one of the manometric tubes overflowing into either of the comparison tubes. In using apparatus such as above described, instability of the zero indication on the manometer T or equivalent device has been found to occur due, for example, to small variations in the suction pressures subsisting in the chamber P. It has, however, been ascertained that stability in operation is promoted by predetermining the ratio of the pressures subsisting on opposite sides of the orifice plates N and O. For this purpose it has been found that the pressure on the down-stream side of the orifice plate should be 0.3 or less of that on the up-stream side. On the other hand, reduction of the former pressure with respect to the latter pressure necessitates a corresponding increase in the capacity of the suction pump Q or the like connected to the outlet, and in order to maintain the requirements of the apparatus in this respect within moderate limits, it has been found desirable that the ratio of the pressures on the down-stream and up-stream sides shall not be lower than 0.2. The ratio of the pressures subsisting in the remaining portions of the comparison tubes E and F also has a bearing on the sensitivity of the apparatus. Thus the maximum sensitivity has been found to be attained when, in respect of each tube, the ratio of the pressure at the exit of the capillary to that at its entrance lies between 0.47 and 0.53, this operating range being independent of the particular pressure maintained on the down-stream sides of the capillaries. Operating under these conditions possesses the additional advantages of (a) minimizing errors due to changes in the external conditions, such as pressure or temperature (b) giving a uniform sensitivity of indication e. g. in the case of nitrogen-oxygen mixtures both viscosity and density vary almost exactly linearly with composition and a linear scale of indication is obtainable under these conditions.

The following is the method of employing the apparatus:—In starting up for the first time the valve S is fully opened and the exhaust pump Q is put in operation; the valve S is then partially closed until the ratio of the pressure on the downstream side to the pressure on the upstream side of each of the orifice plates O and N, as indicated by some form of manometric device connected to P or Q, is at or below 0.3 or between 0.3 and 0.2. This setting of valve S may be retained for all subsequent occasions when the apparatus is operated. The indicating liquid level is then brought to the scale zero reading by adjustment of the valve V when air or standard gas passes through both limbs of the apparatus. Subsequently, when gas under test is passed through one of the limbs, the deflection of the liquid level as read on the scale U is a measure of the composition of the gas under test.

By reversing the valve G, the direction of the deflection—but not its magnitude—is reversed. In this way, a combined doubled deflection can be obtained which is of particular advantage when dealing with gases differing slightly in composition from air, since not only can the deflection be doubled but the precise zero position of the liquid is unimportant. When using the valve G to obtain a doubled deflection of the indicating liquid, the setting of the zero position by means of the valve V, is not essential. In this case, the magnitude of the doubled deflection is a measure of the composition of the gas under test.

For testing gas at a pressure differing from that of the inlet air, the manometric tube W is employed. After starting up the suction as described above, the liquid levels in the tube W are adjusted to equality by means of the valve V and the deflection in the indicating liquid level from the zero mark on the scale U is a measure of the gas composition. The zero mark is determined in the first instance by passing air through both limbs of the instrument. In this case, small secular changes of the zero reading, if any, may be adjusted from time to time by suitably displacing the scale.

Cessation of operation of the apparatus is effected by stopping the suction at Q and, in general, the apparatus will then be again ready for use subsequently on applying such suction.

What I claim and desire to secure by Letters Patent of the United States is:—

1. Gas analysis apparatus comprising in combination two comparison tubes, each having a capillary portion, an inlet to each of said tubes for standard gas and gas under test respectively, a chamber in communication with the outlet of each of said tubes, a plate having an orifice in each of said tubes on the down-stream side of said capillary portion, means for measuring the pressure difference between the gases respectively in those portions of said tubes between said capillary portions and said plates, exhausting apparatus, a tube connecting said chamber with said exhausting apparatus, a branch tube opening into said connecting tube, a valve in said branch tube, a jacket around said comparison tubes on the up-stream side of said capillary portions and having at least one orifice open to the atmosphere, and a tube leading from said jacket to said valve in said branch tube.

2. Gas analysis apparatus comprising in combination two comparison tubes, each having a capillary portion, an inlet to each of said tubes for standard gas and gas under test respectively, a chamber in communication with the outlet of each of said tubes, exhausting apparatus connected to said chamber, a plate having an orifice in each of said tubes on the down-stream side of said capillary portion, means for measuring the pressure difference between the gases respectively in those portions of said tubes between said capillary portions and said plates, a valve capable of fine adjustment in one of said tubes and a by-pass bridging said valve.

3. Gas analysis apparatus comprising in combination two comparison tubes, each having a capillary portion, an inlet to each of said tubes for standard gas and gas under test respectively, a chamber in communication with the outlet of each of said tubes, exhausting apparatus connected to said chamber, a plate having an orifice in each of said tubes on the down-stream side of said capillary portion, means for measuring the pressure difference between the gases respectively in those portions of said tubes between said capillary portions and said plates, a valve capable of fine adjustment in one of said tubes, such tube having a by-pass bridging said valve, and means indicating the pressure difference between the gases respectively in those portions of said tubes on the up-stream side of said capillary portions.

ISAAC FAGELSTON.